United States Patent
Boecker et al.

(10) Patent No.: US 9,878,612 B2
(45) Date of Patent: Jan. 30, 2018

(54) FUEL CONTAINER WITH LIQUID SEPARATOR THAT CAN BE PNEUMATICALLY EMPTIED

(71) Applicant: TI Automotive Technology Center GmbH, Rastatt (DE)

(72) Inventors: Albert J. Boecker, Ettlingen (DE); Andreas W. Dobmaier, Karlsruhe (DE); Alex Ehler, Rastatt (DE); Patrick Gmuend, Karlsruhe (DE); Peter Grauer, Steinweiler (DE); Gerrit Michaelis, Durmersheim (DE); Matthias B. Olbrich, Rastatt (DE)

(73) Assignee: TI Automotive Technology Center GmbH, Rastatt (DE)

( * ) Notice: Subject to any disclaimer, the term of this patent is extended or adjusted under 35 U.S.C. 154(b) by 7 days.

(21) Appl. No.: 14/773,591

(22) PCT Filed: Mar. 6, 2014

(86) PCT No.: PCT/EP2014/054387
§ 371 (c)(1),
(2) Date: Sep. 8, 2015

(87) PCT Pub. No.: WO2014/135658
PCT Pub. Date: Sep. 12, 2014

(65) Prior Publication Data
US 2016/0023549 A1 Jan. 28, 2016

(30) Foreign Application Priority Data
Mar. 8, 2013 (DE) .................. 10 2013 203 994

(51) Int. Cl.
*B01D 53/02* (2006.01)
*B60K 15/035* (2006.01)
(Continued)

(52) U.S. Cl.
CPC .... *B60K 15/03504* (2013.01); *B01D 53/0407* (2013.01); *B60K 15/03519* (2013.01);
(Continued)

(58) Field of Classification Search
CPC ........ B01D 2253/102; B01D 2257/702; B01D 2259/4516; B01D 53/0407;
(Continued)

(56) References Cited

U.S. PATENT DOCUMENTS 5,408,977 A * 4/1995 Cotton ............. B60K 15/03504
123/516
2004/0206398 A1 10/2004 Olshanetsky et al.

OTHER PUBLICATIONS

Written Opinion & International Search Report for PCT/EP2014/054387 dated May 4, 2014, 8 pages.

* cited by examiner

*Primary Examiner* — Christopher P Jones
(74) *Attorney, Agent, or Firm* — Brinks Gilson & Lione

(57) ABSTRACT

A fuel container, in particular for motor vehicles, comprising an aeration and de-aeration device for balancing the internal gas pressure during filling of the container with fuel and during consumption of the fuel during the operation of a working machine powered by the fuel. The aeration and de-aeration device has a separator device for separating liquid fuel from an aeration and de-aeration line. In order to permit the separator device to be emptied, if a fuel pump, which serves this purpose during normal operation, is not in operation, the separator device comprises a housing and a pipe nozzle which is connected to the housing either directly or via a pipeline and in which pressure fluctuations occur as a result of incoming and outgoing fuel, said fluctuations acting as a pump for emptying the separator device.

14 Claims, 2 Drawing Sheets

Figure 1A:
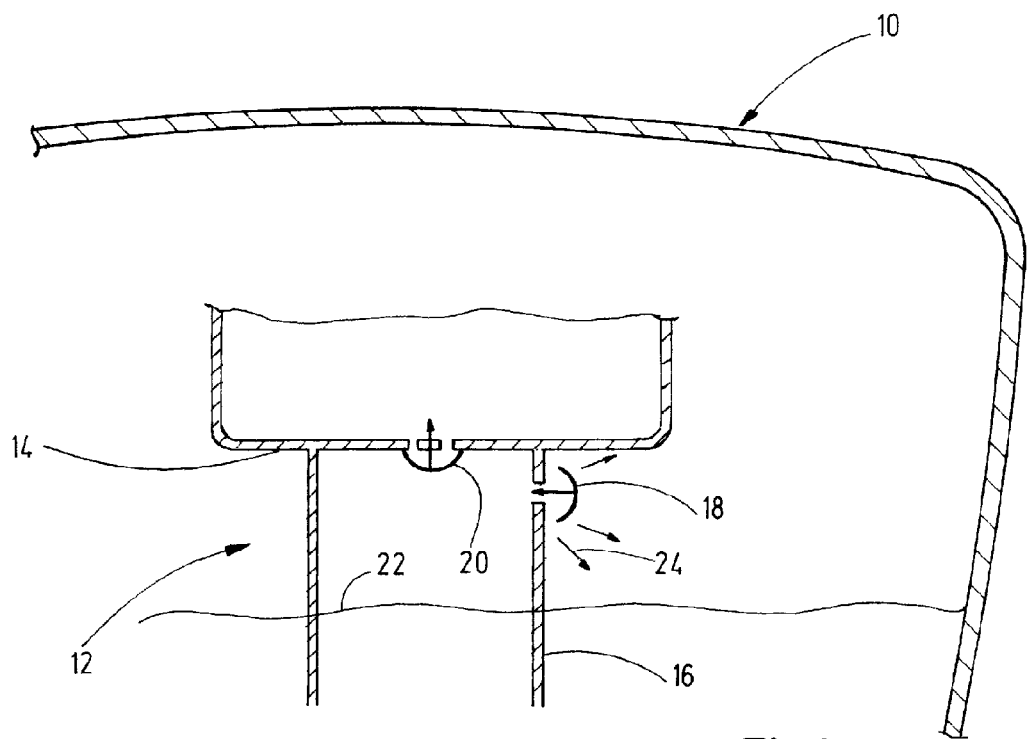
Figure 1B:
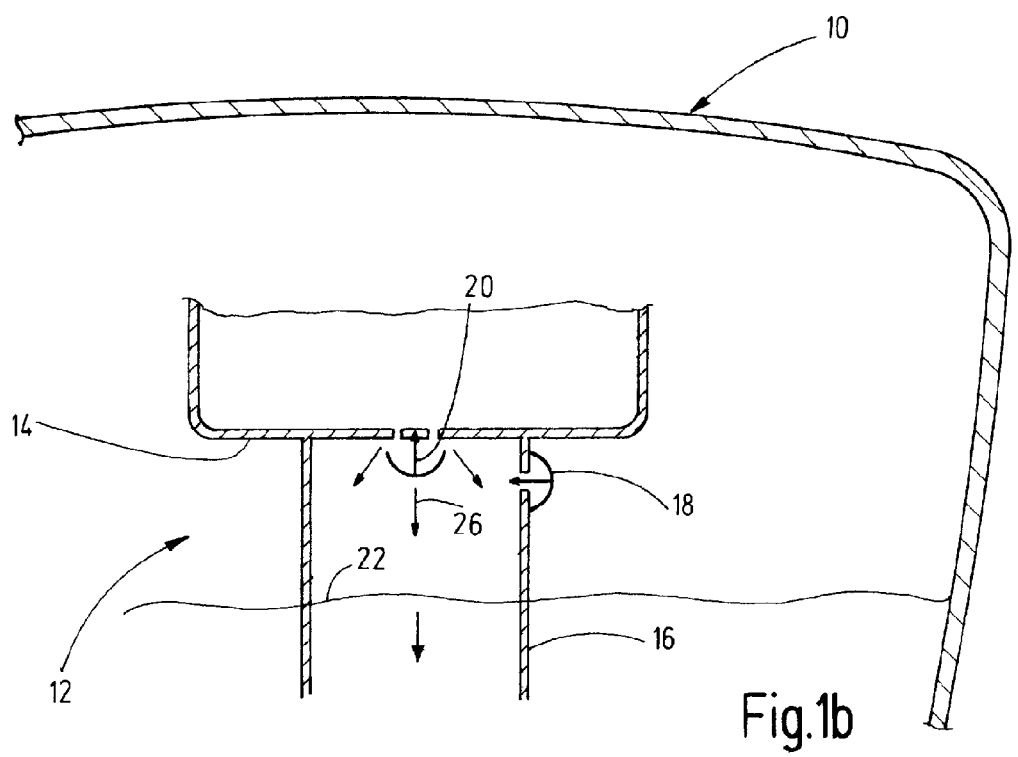

(51) Int. Cl.
*F02M 37/00* (2006.01)
*B01D 53/04* (2006.01)
B60K 15/03 (2006.01)
F02M 25/08 (2006.01)

(52) U.S. Cl.
CPC ... *F02M 37/0082* (2013.01); *B01D 2253/102* (2013.01); *B01D 2257/702* (2013.01); *B01D 2259/4516* (2013.01); *B60K 2015/03282* (2013.01); *B60K 2015/03296* (2013.01); *B60K 2015/03509* (2013.01); *B60K 2015/03514* (2013.01); *F02M 2025/0863* (2013.01)

(58) Field of Classification Search
CPC ........ B60K 15/03504; B60K 15/03519; B61K 2015/03282; B61K 2015/03296; B61K 2015/03509; B61K 2015/03514; F02M 2025/0863; F02M 37/0082
See application file for complete search history.

FUEL CONTAINER WITH LIQUID SEPARATOR THAT CAN BE PNEUMATICALLY EMPTIED

This disclosure relates to a fuel container, in particular for motor vehicles, having a venting device for equalizing an internal gas pressure during the filling of the container with fuel and during the consumption of the fuel during the operation of a machine which is operated by the fuel, wherein the venting device has a separator device for separating liquid fuel from a venting line. This disclosure also relates to a method for emptying a separator device of a venting device of a fuel container.

When filling a fuel container with fuel, venting is necessary in order to direct the gas volume expelled by the incoming fuel out of the container. Likewise, venting of the container when the fuel content is decreasing is necessary in order to avoid an subatmospheric pressure in the container, which could lead, for example, to damage (collapsing) of the container. In this context it is desirable to prevent fuel vapors, usually hydrocarbon vapors, from escaping into the atmosphere. For this purpose, known venting devices have an activated carbon filter which can adsorb hydrocarbon vapors and is regenerated at certain time intervals by feeding the adsorbed vapors into the intake section of the internal combustion engine. In this context, it may be desirable to prevent liquid fuel from entering the activated carbon filter, since the adsorption capacity of the filter would be reduced by this. Therefore, a separator device for liquid fuel, which ensures that only fuel vapors can be passed on to the activated carbon filter, is generally arranged inside, and occasionally also outside, the fuel container. The separator device is emptied while the internal combustion engine is operating, for example by means of the fuel pump. However, in hybrid vehicles which can partially be operated purely electrically, the fuel pump does not run in the electrical operating mode. However, as a result of sloshing movements or the like liquid fuel can still enter the venting device and therefore the separator device and flood them, which results in a risk of contamination of the activated carbon filter with liquid fuel. Since the venting function has to be maintained even in the electrical operating mode, it is, for example, not expedient to disconnect the separator device then from the activated carbon filter simply by means of a shutoff valve.

On this basis, a fuel container and fuel system of the type mentioned at the beginning may be arranged in such a way that effective emptying of the separator device is made possible under most circumstances.

In order to achieve this object, the combination of features specified in patent claim 1 is proposed. Advantageous refinements and developments of the invention can be found in the dependent claims.

The fuel contained in the fuel container is subjected to more or less strong sloshing movements in the driving mode. The kinetic energy contained therein can be used to bring about the desired emptying of the separator device. This can be implemented in a direct mechanical fashion or as "energy harvesting" (energy recovery) by means of one or more energetic conversion stages, for example by driving a generator which itself drives a pump. For reasons of cost and reliability, a configuration which is as simple as possible is to be preferred. According to at least some implementations of the present invention it is therefore proposed that the separator device have a housing and a pipe portion which is connected to the housing directly or via a pipeline and in which pressure fluctuations which can be used as a pump for emptying the separator device occur as a result of incoming and outgoing fuel. The pipe portion is arranged in the container with a downwardly open cross section such that under the circumstances in which liquid fuel can enter the separator device and said device has to be emptied, said container contains a gas volume which is expelled when fuel enters the pipe portion, and when fuel flows out generates an underpressure which removes liquid fuel from the separator device by a suction action. The entry of liquid fuel into the internal region of the pipe portion, and the flowing out of fuel therefrom, take place as a result of the above-mentioned sloshing movements of the fuel during the operation of the vehicle.

In at least some implementations, the venting device expediently has two valves, the first of which permits gases to escape from the pipe portion when liquid fuel enters it, and prevents gases flowing back on the same path when liquid fuel flows out of the pipe portion, which valve therefore opens when fuel enters the pipe portion and closes when fuel exits the pipe portion. This first valve may be embodied as a disk valve. This first valve is expediently arranged in a wall of the pipe portion or in a wall of the pipeline which connects the pipe portion to the housing of the separator device.

The second valve opens and closes in the reverse cycle with respect to the first valve, that is to say it closes when fuel enters the pipe portion and opens when fuel exits the pipe portion. In at least some implementations, the second valve likewise may be embodied as a disk valve. The second valve is fluidically arranged between the interior of the separator device in which the liquid fuel which is to be removed collects and the interior of the pipe portion. For example, the second valve is arranged in a wall of the housing of the separator device between the inner region of the housing and the pipe portion or the pipeline which connects the pipe portion to the housing of the separator device.

As a result of the interaction between the two valves and the pressure fluctuations generated by sloshing movements, a simple pneumatic pump is provided which permits emptying of the separator device independently of the operation of an (electric) fuel pump.

The pipe portion can connect directly to the housing of the separator device or can be connected thereto via a connecting line. In an individual case, this will be dependent on the configuration of the fuel container, the location of the arrangement of the separator device in the fuel container and possible further criteria.

The method for emptying a separator device, arranged in a fuel container, of a venting device may utilize kinetic energy in the form of sloshing movements of fuel which is contained in the fuel container is used to carry out mechanical work in that a valve system of the separator device is acted on directly or indirectly.

In a preferred refinement of the invention, the sloshing movements of the fuel in a volume which is separated off from the container interior and has an inlet opening for the fuel generate a pneumatic pumping effect. Alternatively, the sloshing movements of the fuel can be used, for example, to drive a generator for operating an additional electric pump or the like.

Figure 2A:
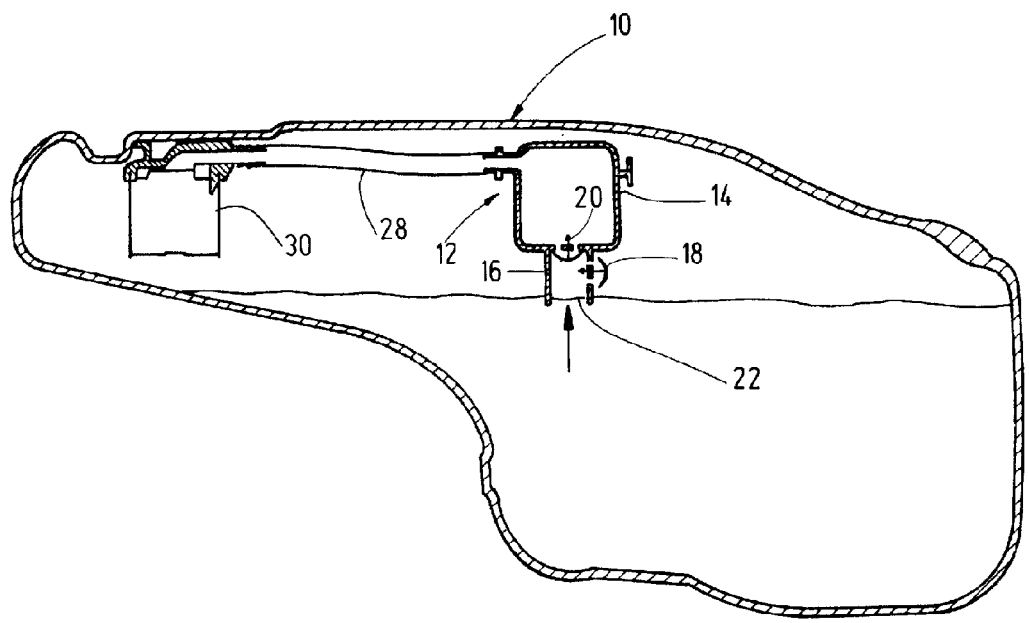
Figure 2B:
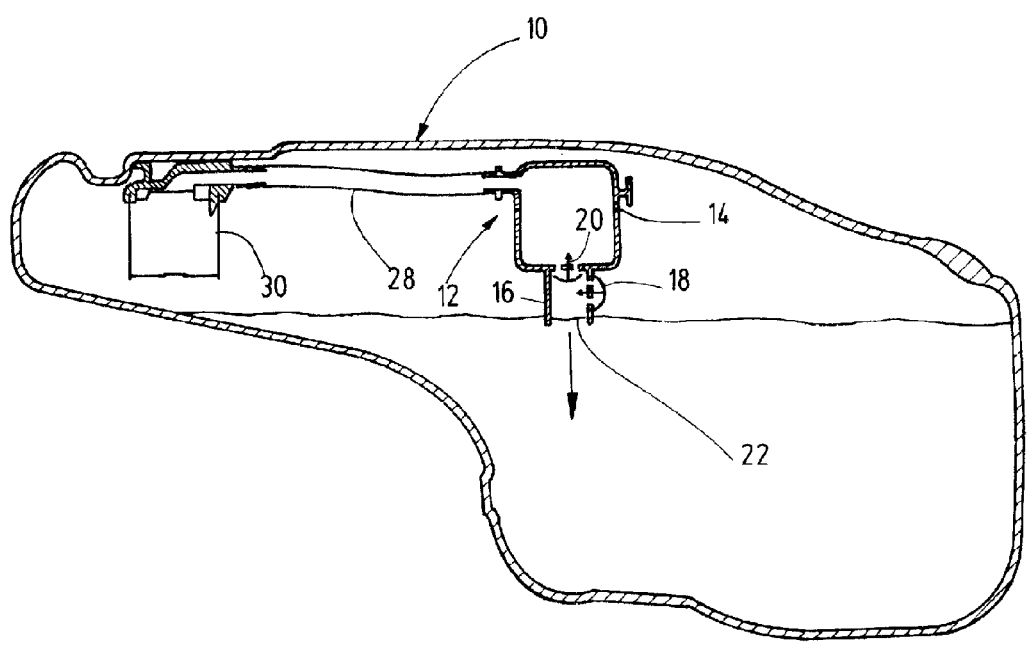

In the following, at least some aspects of the invention will be explained in more detail on the basis of the embodiments illustrated in schematic fashion in the drawing. In the drawing:

FIGS. 1a and b show an illustration of the principle underlying at least some aspects of the invention, and FIGS. 2a and b show a section through a fuel container in the region of a separator device with a pipe portion and two valves for generating a pumping effect as a result of fuel sloshing movements.

In the drawings in FIGS. 1a and b the functional principle of the present disclosure is illustrated. In the interior of a fuel container 10, a separator device 12 for liquid fuel with a housing 14 and a pipe portion 16 which adjoins the housing 14 and is open to the floor of the fuel container is arranged as part of a venting device for the container. In the upper region of the pipe portion 16, a first valve 18, which opens toward the outer region of the pipe portion 16, is arranged in the wall thereof. In the lower wall of the housing 14, where said housing 14 bounds the pipe portion 16 in the upward direction, a second valve 20, which opens toward the interior of the pipe portion 16, is arranged.

The pipe portion 16 dips with its lower region into the liquid fuel, and the liquid fuel can flow into the downwardly open pipe portion when sloshing movements occur. When the liquid level 22 in the pipe portion 16 rises, the gas volume which is present therein is compressed. As a result, the first valve 18 is activated in the opening direction, and the gas can escape in the direction of the arrows 24. If the liquid level 22 in the pipe portion 16 drops again, the first valve 18 as a result closes in a gas-tight fashion and a reduced pressure occurs in the interior of the pipe portion 16, in particular with respect to the interior of the housing 14. As a result of the pressure difference between the interior of the housing 14 and the interior of the pipe portion 16, the second valve is activated in the opening direction, with the result that liquid fuel, which is present in the housing 14, can flow into the pipe portion 16 through the second valve 20 in the direction of the arrows 26. The cycle described above repeats in the rhythm of the sloshing movements of the liquid fuel, with the result that correspondingly clocked emptying of the separator device 12 occurs.

An embodiment of the invention is illustrated in FIGS. 2a and b in section. In addition to a series of further components of the fuel system which are not illustrated in more detail (fuel pump, filter, component carrier and the like), a venting device, which comprises the separator device 12 with the housing 14 and the pipe portion 16 as well as the valves 18 and 20, is arranged in the container 10. The housing 14 of the separator device is connected via a pipeline 28 to vent valve 30. A further pipeline leads from the separator device, in a way which is not illustrated in more detail, to an activated carbon filter which removes the polluting portion of fuel from the venting gas and largely allows pure air to escape into the atmosphere.

Direct connection of the pipe portion 16 to the housing 14 is not necessary. Instead, the housing 14 and the pipe portion 16 can, depending on requirements, be arranged at different locations in the container 10 and be connected to one another via a connecting line. The configuration of the pipe portion 16 which is illustrated here in the manner of a cylinder section can also be varied and adapted to the respective conditions and requirements insofar as the basic function of the pumping effect in the case of inflowing and outflowing fuel is maintained to an extent which prevents flooding of the venting device with liquid fuel.

In summary, the following is to be noted: a fuel container, in particular for motor vehicles, having a venting device for equalizing an internal gas pressure during the filling of the container with fuel and during the consumption of the fuel during the operation of a machine which is operated by the fuel, wherein the venting device has a separator device for separating liquid fuel from a vent line. In order to permit emptying of the separator device 12 even when a fuel pump which is used for this purpose in the normal operating mode is not operating, the separator device 12 has a housing 14 and a pipe portion 16 which is connected to the housing directly or via a pipeline and in which pressure fluctuations which can be used as a pump for emptying the separator device occur as a result of incoming and outgoing fuel.

The invention claimed is:

1. A fuel container having a venting device for equalizing an internal gas pressure during filling of the container with fuel and during consumption of the fuel during operation of a machine which is operated by the fuel, wherein the venting device has a separator device for separating liquid fuel from a vent line wherein the separator has a housing and a pipe portion which is connected to the housing directly or via a pipeline and in which a lower end of the pipe portion is open to an interior of the container and configured such that vapor pressure fluctuations inside the pipe portion are used to pump fuel in the separator device to the container for emptying the separator device, the vapor pressure fluctuations occurring as a result of incoming and outgoing fuel, wherein the separator device has a first valve structured to open when the fuel enters the pipe portion and structured to close when the fuel exits the pipe portion, and wherein the separator device has a second valve structured to close when the fuel enters the pipe portion and structured to open when the fuel exits the pipe portion.

2. The fuel container as claimed in claim 1, wherein the first valve is a disk valve.

3. The fuel container as claimed in claim 1 wherein the first valve is arranged in a side wall of the pipe portion or in a side wall of the pipeline which connects the pipe portion to the housing of the separator device.

4. The fuel container as claimed in claim 1, wherein the second valve is a disk valve.

5. The fuel container as claimed in claim 1, wherein the second valve is arranged in a wall of the housing of the separator device between the inner region of the housing and the pipe portion or the pipeline which connects the pipe portion to the housing of the separator device.

6. The fuel container as claimed in claim 1, wherein the separator device is connected via a connecting line to an activated carbon filter which prevents fuel vapors from escaping into the atmosphere.

7. The fuel container as claimed in claim 2, wherein the first valve is arranged in a wall of the pipe portion or in a wall of the pipeline which connects the pipe portion to the housing of the separator device.

8. The fuel container as claimed in claim 4, wherein the second valve is arranged in a wall of the housing of the separator device between the inner region of the housing and the pipe portion or the pipeline which connects the pipe portion to the housing of the separator device.

9. The fuel container as claimed in claim 1, wherein the separator device is connected via a connecting line to an activated carbon filter which prevents fuel vapors from escaping into the atmosphere.

10. The fuel container as claimed in claim 3, wherein the separator device is connected via a connecting line to an activated carbon filter which prevents fuel vapors from escaping into the atmosphere.

11. The fuel container as claimed in claim 1, wherein the separator device is connected via a connecting line to an activated carbon filter which prevents fuel vapors from escaping into the atmosphere.

12. The fuel container as claimed claim 5, wherein the separator device is connected via a connecting line to an activated carbon filter which prevents fuel vapors from escaping into the atmosphere.

13. The fuel container as claimed claim 1, wherein the first valve is located below the second valve.

14. The fuel container as claimed claim 1, wherein fuel in the housing flows downstream from the housing through the pipe portion, and wherein the second valve is located upstream of the first valve.

* * * * *